US007299216B1

(12) United States Patent
Liang et al.

(10) Patent No.: US 7,299,216 B1
(45) Date of Patent: Nov. 20, 2007

(54) METHOD AND APPARATUS FOR SUPERVISING EXTRACTION/TRANSFORMATION/LOADING PROCESSES WITHIN A DATABASE SYSTEM

(75) Inventors: Shih-Tsung Liang, Hsinchu (TW); Chiu-Fang Chien, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 690 days.

(21) Appl. No.: 10/266,409

(22) Filed: Oct. 8, 2002

(51) Int. Cl.
*G06F 7/00* (2006.01)
*G06F 17/30* (2006.01)
(52) U.S. Cl. .................... 707/1; 707/2; 707/4; 707/10; 707/100; 707/101
(58) Field of Classification Search ..... 707/100–104.1, 707/3, 6, 204, 200–202, 1, 2, 4; 705/8, 10; 709/224
See application file for complete search history.

(56) References Cited

U.S. PATENT DOCUMENTS

| | | | | |
|---|---|---|---|---|
| 5,781,911 A | * | 7/1998 | Young et al. ............... | 707/201 |
| 6,032,158 A | * | 2/2000 | Mukhopadhyay et al. .. | 707/201 |
| 6,070,190 A | | 5/2000 | Reps et al. ................. | 709/224 |
| 6,151,608 A | * | 11/2000 | Abrams ....................... | 707/204 |
| 6,189,004 B1 | * | 2/2001 | Rassen et al. ................. | 707/3 |
| 6,208,990 B1 | * | 3/2001 | Suresh et al. .................. | 707/6 |
| 6,604,110 B1 | * | 8/2003 | Savage et al. .............. | 707/102 |
| 6,721,749 B1 | * | 4/2004 | Najm et al. .................. | 707/100 |
| 6,757,689 B2 | * | 6/2004 | Battas et al. ................ | 707/101 |
| 6,789,096 B2 | * | 9/2004 | Sankaran et al. ........... | 707/203 |
| 6,839,724 B2 | * | 1/2005 | Manchanda et al. ........ | 707/203 |
| 6,850,947 B1 | * | 2/2005 | Chung et al. ............... | 707/101 |
| 6,915,286 B2 | * | 7/2005 | Policastro et al. ............. | 707/1 |
| 2002/0138316 A1 | * | 9/2002 | Katz et al. ...................... | 705/7 |
| 2002/0143733 A1 | * | 10/2002 | Mukkamalla et al. .......... | 707/1 |
| 2002/0161778 A1 | * | 10/2002 | Linstedt ....................... | 707/102 |
| 2002/0198902 A1 | * | 12/2002 | Sankaran et al. ........... | 707/203 |
| 2003/0115080 A1 | * | 6/2003 | Kasravi et al. ................ | 705/1 |

(Continued)

FOREIGN PATENT DOCUMENTS

WO WO99/24922 * 5/1999

OTHER PUBLICATIONS

Lou Agosta—"Market Overview Upate: ETL"—Giga Information Group, Inc. Mar. 19, 2002 (pp. 1-8).*

(Continued)

*Primary Examiner*—Shahid Alam
*Assistant Examiner*—Anh Ly
(74) *Attorney, Agent, or Firm*—Haynes and Boone, LLP

(57) ABSTRACT

A method and apparatus that catalogs the characteristics and scheduling of multiple ETL procedures or processes as the multiple ETL procedures extract, transform data from a first database to load the data to a second database. The method and apparatus catalogs the progress and success of execution of multiple ETL procedures. The method and apparatus determines the necessary scheduling for cleansing operations of the first database, then initiates the cleansing operation of the first database, and then catalogs the progress of a cleansing process performed on a database to eliminate inconsistencies, redundancies, and corruptions of the database. The method and apparatus determines any errors in the execution of the ETL procedures and transmits an error message describing the errors to a person.

21 Claims, 9 Drawing Sheets

U.S. PATENT DOCUMENTS

| | | | |
|---|---|---|---|
| 2003/0120477 A1* | 6/2003 | Kruk et al. | 704/2 |
| 2003/0120593 A1* | 6/2003 | Bansal et al. | 705/39 |
| 2003/0187716 A1* | 10/2003 | Lee | 705/10 |
| 2003/0220860 A1* | 11/2003 | Heytens et al. | 705/35 |
| 2003/0220901 A1* | 11/2003 | Carr et al. | 707/1 |
| 2004/0015381 A1* | 1/2004 | Johnson et al. | 705/8 |
| 2004/0064443 A1* | 4/2004 | Taniguchi et al. | 707/3 |
| 2004/0133551 A1* | 7/2004 | Linstedt | 707/1 |
| 2005/0091156 A1* | 4/2005 | Hailwood et al. | 705/40 |

OTHER PUBLICATIONS

Erhard Rahm & Hong Hai Do—"Data Cleaning: Problems and Current Approaches"—IEEE Technical Commitee on Data Engineering—Dec. 2000 (pp. 1-11).*

Peter J. Weyman, "The Case for a process-Driven Approach to Data Warehousing"—Database and Network Journal, vol. 27, No. 1, Feb. 1, 1997, (pp. 3-6).*

Vassiliadis et al. "Conceptual Modeling for ETL Processes"—ACM Nov. 8, 2002 (pp. 14-21).*

Michael Stonebraker "Too Much Middleware" SIGMOD Record, Vo.. 31, No. 1, Mar. 2002 (pp. 97-106).*

Search Database.com Definitions, Powered by whatis.com [online]. http://searchdatabase.techtarget.com/s Definition/O., sid13_gci51 9447, on html, [Retrieved on Jul. 3, 2002].

"How to Select an Extraction/Transformation/Loading (ETL) Tool", Mimno, 101 Communications LLC, Chatsworth, CA 91311, Found Jun. 27, 2002 www.101dataintelligencesolutions.com.

Taiwan Patent TW 4 39028 to Reps et al., "Client-Based Application Availability and Response Monitoring and Reporting for Distributed Computing Environments".

* cited by examiner

FIG. 1 – Prior Art

ETL PROGRAM RECORD

| PGM NAME | PRG SUB | SEQ | LAST UPDT TIME | UPDATE TIME | TRG TAB | REC K FLD | FREQ |
|---|---|---|---|---|---|---|---|
| PRG PRC1 | SUB A | 1-01 | 04-05-01 04.38.38 | 11-18-01 18.14.45 | TAB 1 | K FLD 1 | DLY |
| PRG PRC2 | SUB A | 1-02 | 07-25-01 19.29.54 | 11-19-01 12.12.26 | TAB 2 | K FLD 2 | MNTH |
| PRG PRC3 | SUB A | 1-03 | 01-29-01 00.40.40 | 11-20-01 10.05.28 | TAB 3 | K FLD 3 | MNTH |
| PRG PRC4 | SUB A | 1-04 | 10-22-01 14.08.55 | 11-21-01 14.19.18 | TAB 4 | K FLD 4 | BIMTH |
| PRG PRC5 | SUB B | 1-05 | 11-11-01 22.27.46 | 11-22-01 17.58.29 | TAB 5 | K FLD 5 | WKLY |
| PRG PRC6 | SUB B | 1-06 | 12-07-01 03.59.21 | 11-23-01 15.03.31 | TAB 6 | K FLD 6 | WKLY |
| PRG PRC7 | SUB B | 1-07 | 06-09-01 15.14.29 | 11-24-01 06.34.44 | TAB 7 | K FLD 7 | WKLY |
| PRG PRC8 | SUB B | 1-08 | 07-18-01 03.15.51 | 11-25-01 09.56.29 | TAB 8 | K FLD 8 | MNTH |
| PRG PRC9 | SUB B | 1-09 | 12-25-01 23.12.13 | 11-26-01 05.39.27 | TAB 9 | K FLD 9 | MNTH |
| PRG PRC10 | SUB B | 1-10 | 08-16-01 06.39.24 | 11-27-01 07.57.53 | TAB 10 | K FLD 10 | MNTH |
| PRG PRC11 | SUB C | 1-11 | 06-30-01 04.15.49 | 11-28-01 09.38.20 | TAB 11 | K FLD 11 | WKLY |
| PRG PRC12 | SUB C | 1-12 | 07-26-01 22.19.10 | 11-29-01 13.26.02 | TAB 12 | K FLD 12 | BIMTH |
| PRG PRC13 | SUB C | 1-13 | 07-14-01 12.06.32 | 11-30-01 13.22.20 | TAB 13 | K FLD 13 | MNTH |
| PRG PRC14 | SUB C | 1-14 | 10-15-01 07.24.50 | 12-01-01 07.16.33 | TAB 14 | K FLD 14 | DLY |
| PRG PRC15 | SUB C | 1-15 | 04-02-01 01.37.20 | 12-02-01 14.00.28 | TAB 15 | K FLD 15 | WKLY |
| PRG PRC16 | SUB D | 1-16 | 10-29-01 01.44.31 | 12-03-01 06.56.02 | TAB 16 | K FLD 16 | BIMTH |
| PRG PRC17 | SUB D | 2-01 | 09-10-01 00.23.54 | 12-04-01 15.44.34 | TAB 17 | K FLD 17 | BIMTH |
| PRG PRC18 | SUB D | 2-02 | 09-29-01 05.54.10 | 12-05-01 05.56.30 | TAB 18 | K FLD 18 | DLY |
| PRG PRC19 | SUB D | 2-03 | 03-07-01 16.39.14 | 12-06-01 14.54.35 | TAB 19 | K FLD 19 | DLY |
| PRG PRC20 | SUB E | 2-04 | 07-09-01 01.56.13 | 12-07-01 09.22.49 | TAB 20 | K FLD 20 | DLY |
| PRG PRC21 | SUB E | 2-05 | 12-01-01 22.05.48 | 12-08-01 18.26.07 | TAB 21 | K FLD 21 | MNTH |
| PRG PRC22 | SUB E | 2-06 | 06-05-01 07.48.28 | 12-09-01 02.05.00 | TAB 22 | K FLD 22 | MNTH |

FIG. 4

| ETL CONTROL LOG | | | | | | |
|---|---|---|---|---|---|---|
| PGM NAME | RECORD TIME | REC KEY VAL | TRG TAB | ERROR CODE | ERR MSG | ERR TYP |
| PRG PRC1 | 07-25-01 19.29.54 | K FLD VAL=49 | TRG TAB1 | ER CD VAL=99 | COMP DLY | FAIL |
| PRG PRC2 | 09-01-01 22.54.58 | K FLD VAL=97 | TRG TAB2 | ER CD VAL=15 | SHIP DLY | CAUTION |
| PRG PRC3 | 08-05-01 21.43.42 | K FLD VAL=45 | TRG TAB3 | ER CD VAL=64 | SHIP DLY | CAUTION |
| PRG PRC4 | 11-15-01 04.41.10 | K FLD VAL=30 | TRG TAB4 | ER CD VAL=65 | SHIP DLY | CAUTION |
| PRG PRC5 | 03-25-01 19.15.25 | K FLD VAL=28 | TRG TAB5 | ER CD VAL=55 | SHIP DLY | CAUTION |
| PRG PRC6 | 08-30-01 22.29.01 | K FLD VAL=85 | TRG TAB6 | ER CD VAL=92 | PRC INCOR | FAIL |
| PRG PRC7 | 05-16-01 12.07.43 | K FLD VAL=94 | TRG TAB7 | ER CD VAL=75 | SHIP DLY | CAUTION |
| PRG PRC8 | 02-04-01 01.28.32 | K FLD VAL=43 | TRG TAB8 | ER CD VAL=58 | QTY INCON | WARN |
| PRG PRC9 | 03-07-01 19.58.48 | K FLD VAL=78 | TRG TAB9 | ER CD VAL=71 | QTY INCON | WARN |
| PRG PRC10 | 12-03-01 15.05.04 | K FLD VAL=17 | TRG TAB10 | ER CD VAL=42 | QTY INCON | WARN |
| PRG PRC11 | 07-24-01 12.39.52 | K FLD VAL=56 | TRG TAB11 | ER CD VAL=11 | PRC INCOR | FAIL |
| PRG PRC12 | 08-06-01 05.45.39 | K FLD VAL=31 | TRG TAB12 | ER CD VAL=52 | COMP DLY | FAIL |
| PRG PRC13 | 10-02-01 18.05.50 | K FLD VAL=92 | TRG TAB13 | ER CD VAL=82 | SHIP DLY | CAUTION |
| PRG PRC14 | 02-24-01 16.06.07 | K FLD VAL=4 | TRG TAB14 | ER CD VAL=35 | COMP DLY | FAIL |
| PRG PRC15 | 02-22-01 08.48.43 | K FLD VAL=9 | TRG TAB15 | ER CD VAL=83 | PRC INCOR | FAIL |
| PRG PRC16 | 12-22-01 08.51.11 | K FLD VAL=94 | TRG TAB16 | ER CD VAL=64 | PRC INCOR | FAIL |
| PRG PRC17 | 05-04-01 05.04.24 | K FLD VAL=4 | TRG TAB17 | ER CD VAL=60 | COMP DLY | FAIL |
| PRG PRC18 | 07-12-01 12.19.02 | K FLD VAL=69 | TRG TAB18 | ER CD VAL=33 | SHIP DLY | CAUTION |
| PRG PRC19 | 06-26-01 06.30.21 | K FLD VAL=25 | TRG TAB19 | ER CD VAL=97 | COMP DLY | FAIL |
| PRG PRC20 | 09-06-01 01.17.11 | K FLD VAL=86 | TRG TAB20 | ER CD VAL=35 | SHIP DLY | CAUTION |
| PRG PRC21 | 09-28-01 00.40.50 | K FLD VAL=13 | TRG TAB21 | ER CD VAL=47 | COMP DLY | FAIL |
| PRG PRC22 | 12-15-01 03.11.00 | K FLD VAL=15 | TRG TAB22 | ER CD VAL=15 | PRC INCOR | FAIL |

FIG. 5

| ETL CLEAN LOG | | | | | |
|---|---|---|---|---|---|
| PGM NAME | TRG TABL | CLEAN TABLE | UPDATE TIME | TRIG KEY LST | CLEAN KEY LIST |
| PRG PRC1 | TRG TAB 1 | CLEAN TAB 1 | 10-21-01 21.13.10 | TRIG KEY VAL=1 | CLEAN KEY VAL=1 |
| PRG PRC2 | TRG TAB 2 | CLEAN TAB 2 | 10-08-01 19.05.59 | TRIG KEY VAL=2 | CLEAN KEY VAL=2 |
| PRG PRC3 | TRG TAB 3 | CLEAN TAB 3 | 08-27-01 01.56.12 | TRIG KEY VAL=3 | CLEAN KEY VAL=3 |
| PRG PRC4 | TRG TAB 4 | CLEAN TAB 4 | 08-29-01 14.32.42 | TRIG KEY VAL=4 | CLEAN KEY VAL=4 |
| PRG PRC5 | TRG TAB 5 | CLEAN TAB 5 | 10-15-01 14.32.42 | TRIG KEY VAL=5 | CLEAN KEY VAL=5 |
| PRG PRC6 | TRG TAB 6 | CLEAN TAB 6 | 08-30-01 22.19.53 | TRIG KEY VAL=6 | CLEAN KEY VAL=6 |
| PRG PRC7 | TRG TAB 7 | CLEAN TAB 7 | 10-29-01 13.20.58 | TRIG KEY VAL=7 | CLEAN KEY VAL=7 |
| PRG PRC8 | TRG TAB 8 | CLEAN TAB 8 | 09-16-01 05.03.16 | TRIG KEY VAL=8 | CLEAN KEY VAL=8 |
| PRG PRC9 | TRG TAB 9 | CLEAN TAB 9 | 11-07-01 09.50.01 | TRIG KEY VAL=9 | CLEAN KEY VAL=9 |
| PRG PRC10 | TRG TAB 10 | CLEAN TAB 10 | 10-09-01 09.14.52 | TRIG KEY VAL=10 | CLEAN KEY VAL=10 |
| PRG PRC11 | TRG TAB 11 | CLEAN TAB 11 | 11-27-01 09.42.43 | TRIG KEY VAL=11 | CLEAN KEY VAL=11 |
| PRG PRC12 | TRG TAB 12 | CLEAN TAB 12 | 10-26-01 16.59.22 | TRIG KEY VAL=12 | CLEAN KEY VAL=12 |
| PRG PRC13 | TRG TAB 13 | CLEAN TAB 13 | 09-27-01 10.06.39 | TRIG KEY VAL=13 | CLEAN KEY VAL=13 |
| PRG PRC14 | TRG TAB 14 | CLEAN TAB 14 | 11-02-01 04.54.27 | TRIG KEY VAL=14 | CLEAN KEY VAL=14 |
| PRG PRC15 | TRG TAB 15 | CLEAN TAB 15 | 10-22-01 23.53.24 | TRIG KEY VAL=15 | CLEAN KEY VAL=15 |
| PRG PRC16 | TRG TAB 16 | CLEAN TAB 16 | 07-23-01 21.40.24 | TRIG KEY VAL=16 | CLEAN KEY VAL=16 |
| PRG PRC17 | TRG TAB 17 | CLEAN TAB 17 | 12-30-01 04.11.33 | TRIG KEY VAL=17 | CLEAN KEY VAL=17 |
| PRG PRC18 | TRG TAB 18 | CLEAN TAB 18 | 07-21-01 16.17.33 | TRIG KEY VAL=18 | CLEAN KEY VAL=18 |
| PRG PRC19 | TRG TAB 19 | CLEAN TAB 19 | 10-13-01 13.04.04 | TRIG KEY VAL=19 | CLEAN KEY VAL=19 |
| PRG PRC20 | TRG TAB 20 | CLEAN TAB 20 | 11-25-01 10.13.14 | TRIG KEY VAL=20 | CLEAN KEY VAL=20 |
| PRG PRC21 | TRG TAB 21 | CLEAN TAB 21 | 08-13-01 20.53.32 | TRIG KEY VAL=21 | CLEAN KEY VAL=21 |
| PRG PRC22 | TRG TAB 22 | CLEAN TAB 22 | 08-24-01 18.29.55 | TRIG KEY VAL=22 | CLEAN KEY VAL=22 |

FIG. 6

METHOD AND APPARATUS FOR SUPERVISING EXTRACTION/TRANSFORMATION/LOADING PROCESSES WITHIN A DATABASE SYSTEM

BACKGROUND OF THE INVENTION

1. Field of the Invention

The present invention relates to database systems. More particularly, the present invention pertains to apparatus and methods for supervision of data extraction, transformation, and loading (ETL) procedures in data warehousing and data mart applications.

2. Description of Related Art

A data warehouse, as is known in the art, is a central repository for all or significant parts of the data that an enterprise's various business systems collect. Typically, a data warehouse is housed on an enterprise server computing system. Data from various processing applications and other sources is selectively extracted and organized on the data warehouse database for use by analytical applications and user queries. Data extracted and organized from a data warehouse is often placed in a data mart. A data mart is a repository of data gathered from operational data and other sources such a data warehouse that is designed to serve a particular group of people requiring the information.

It is known in the art that in managing databases, extract, transform, and load (ETL) refers to three separate functions combined into a single program procedure. First, the extract function reads data from a specified source database and extracts a desired subset of data. Next, the transform function works with the acquired data—using rules or lookup tables, or creating combinations with other data—to convert it to the desired state. Finally, the load function is used to write the resulting data (either all of the subset or just the changes) to a target database, which may or may not previously exist.

ETL procedures can be used to acquire a temporary subset of data for reports or other purposes, or a more permanent data set may be acquired for other purposes such as: the population of a data mart or data warehouse; conversion from one database type to another, and the migration of data from one database or platform to another.

The definitions of the data warehouse, data mart and ETL procedures were found 7/3/2002, at www.searchDatabase.com.

Refer now to FIG. 1 for a description of a database processing system of the prior art. Programming applications $10a, 10b, \ldots 10n$ are executed by computer processors to create data that is stored in specific databases in database storage units $15a, 15b, \ldots, 15n$. The programming applications $10a, 10b, \ldots 10n$ are applications such as On-Line Transaction Programs (OLTP), where customers are able to create data such as purchases or sale order entry. The ETL procedures $25a, 25b, 25c, \ldots, 25n$ are executed by the computer processors to remove data from the databases in the database storage units $15a, 15b, \ldots, 15n$, transform the data to the desired state and format, and loading of the transformed data to the data warehouse 40.

Historical data generated by older computer systems is maintained on a "legacy database" in a separate database storage unit 20. The legacy database similarly is extracted, transformed, and loaded by the legacy ETL procedure 30 to the data warehouse 40 for integration with the currently generated data from the program applications $10a, 10b, \ldots 10n$.

In order to prevent the database information within the database storage units from being modified and potentially corrupted, an operational data storage (ODS) staging unit 35 is employed by the ETL procedures $25a, 25b, 25c, \ldots, 25n$, and 30 as a staging database retention device. The ETL procedures $25a, 25b, 25c, \ldots, 25n$, and 30 perform the transformations of the data from the database storage units $15a, 15b, \ldots, 15n$, and 20 prior to placement of the data to the data warehouse 40.

The ETL procedures $25a$ and $25b$ illustrate that multiple ETL procedures may be performed on a database from a single database storage unit $15a, 15b, \ldots, 15n$,. The transformation portion of the ETL procedure performs different conversions to the database for placement in the data warehouse 40. To improve the quality of the database or segment of the database being extracted from each of the database storage units $15a, 15b, \ldots, 15n$, a cleansing process is executed to eliminate any inconsistencies, redundancies, and corruptions from the data being extracted. The cleansing process may be a separate program executed by the computer processor or a sub-procedure of the ETL procedure $25a, 25b, \ldots, 25n$.

The data marts $50a, 50b, \ldots 50n$ are databases within database storage units that are created to serve a particular group requiring an individualized database. The ETL procedures $45a, 45b, \ldots, 45n$ create and maintain of the data marts $50a, 50b, \ldots 50n$ by extracting the necessary data from the data warehouse 40, transforming the data to meet the particular group requirements, and storing the data in databases $50a, 50b, \ldots 50n$ retained in database storage units.

As is apparent, large enterprises may have many databases stored on database storage units $15a, 15b, \ldots, 15n$, 20, and $50a, 50b, \ldots 50n$. To create and maintain one or more data warehouses, many ETL procedures $25a, 25b, 25c, \ldots, 25n$ are executed periodically to extract, transform, and load the data from the data storage units $15a, 15b, \ldots, 15n$ to the data warehouse 40. The ETL procedures $45a, 45b, \ldots, 45n$ then create and maintain the data within the data marts $50a, 50b, \ldots 50n$. The quality, effectiveness, and success of each of the ETL procedures $25a, 25b, 25c, \ldots, 25n, 30, 45a, 45b, \ldots$, and $45n$ is monitored and the success or failure communicated individually. There is no central repository of the status of the ETL procedures $25a, 25b, 25c, \ldots, 25n, 30, 45a, 45b, \ldots$, and $45n$ as a whole.

U.S. Pat. No. 6,208,990 (Suresh, et al.) teaches a computer software architecture to automatically optimize the throughput of data extraction/transformation/loading (ETL) process in data warehousing applications. This architecture has a component aspect and a pipeline-based aspect. The component aspect refers to the fact that every transformation used in this architecture is built up with transformation components selected from an extensible set of transformation components. Besides simplifying source code maintenance and adjustment for the data warehouse users, these transformation components also provide these users the building blocks to effectively construct pertinent and functionally sophisticated transformations in a pipelined manner. Within a pipeline, each transformation component automatically stages or streams its data to optimize ETL throughput. Furthermore, each transformation either pushes data to another transformation component, pulls data from another transformation component, or performs a push/pull operation on the data. Thereby, the pipelining; staging/streaming; and pushing/pulling features of the transformation components effectively optimizes the throughput of the ETL procedure.

U.S. Pat. No 6,189,004 (Rassen, et al.) demonstrates a method and apparatus for creating a data mart and for creating a query structure for the data mart. The method automatically defines a query interface for a data mart. The data mart includes fact and dimension tables. The method comprises accessing a schema description and a query interface description for the data mart. The schema description specifies a schema, which in turn, defines the relationships between the fact tables and dimension tables of the data mart. The query interface description specifies the fields, related to the schema description, which can be used in a query and the way in which results are to be presented to the user. The fields correspond to columns and rows in the fact tables. The schema description is used to create a first set of commands to create and populate the fact and dimension tables. Additionally, a second set of commands to create the query interface is created. Some commands of the first set of commands are executed causing the creation and population of the tables. Some commands of the second set of commands are executed causing the creation of a user interface. A query is generated using the user interface. The query is sent to the system for processing. The results of the query are presented to the user according the second set of commands.

U.S. Pat. No. 6,151,608 (Abrams) describes a method and system for migrating data from one or more ASCII files and/or from one or more relational databases to one or more relational database tables without the need to write code. Abrams allows the user to define mapping templates and conditionals to assist in translating and transforming data values. Referential integrity, data dependencies, order of operations, and uniqueness constraints are enforced using a predefined set of migration rules templates that are based on the principles of relational design. The mapping and migration rules templates are used to intelligently generate instructions for updating or populating relational database destination tables. The instructions control the data transfer, data translation, data transformation, data validation, foreign key insertion, and the addition of required codes and flags in the destination tables. A migration engine of the system includes a data map architect and an update processor, which spawns the templates and migrates the data dynamically, utilizing the data definitions for the destination tables. In addition to supporting conversion efforts, Support for performing consolidation, restoration from an archive, migration to new instances, upgrading to a new release, adding additional features and enhancements, and changing business requirements is provided. The audit trail is complete enough that the entire migration process can be reversed without compromising the integrity of either the source or the destination application.

"How to Select an Extraction/Transformation/Loading (ETL) Tool", Mimno, 101communications LLC, Chatsworth, Calif. 91311, found 6/27/2002 www.101dataintelligencesolutions.com, provides techniques for selecting an appropriate ETL tool. The ETL tool operates at the heart of the data warehouse, extracting data from multiple data sources, transforming the data to make it accessible to business analysis, and loading multiple target databases. Unlike other components of a data warehousing architecture, it's extremely difficult to switch from one ETL tool to another. Because of a lack of standards, data definitions and transformation rules cannot be moved from one tool to another. If the selected ETL tool fails in production, it is the one component of the architecture that isn't easily replaceable.

SUMMARY OF THE INVENTION

An object of this invention is to provide a method and apparatus that catalogs the characteristics and scheduling of multiple ETL procedures or processes as the multiple ETL procedures extract, transform data from a first database to a second database.

Another object of this invention is to provide a method and apparatus that catalogs the progress and success of execution of multiple ETL procedures.

Further another object of this invention is to provide a method and apparatus that catalogs the progress of a cleansing process performed on a database to eliminate inconsistencies, redundancies, and corruptions of the database.

To accomplish at least one of these objects and other objects a method for the supervision of at least one extraction, transformation, and loading (ETL) procedure of a first database to create a second data base begins with determining a scheduling for execution of the ETL procedure; and at a time when the ETL procedure is scheduled to be executed, executing the ETL procedure. The method then logs procedure records for the ETL procedure detailing characteristics and scheduling of the ETL procedure. The method continues with logging control records for the ETL procedure detailing status of the ETL procedure. A scheduling for cleansing the first database is determined from the ETL procedure. At a time, when the cleansing is scheduled to be executed, the first database is cleansed to eliminate inconsistencies, redundancies, and corruptions from the first database. Finally the method logs a cleansing record for the ETL procedure detailing a cleansing schedule for the first database.

The logging of the procedure for the ETL procedure records a name for the ETL procedure, a subject for the ETL procedure, a sequence number of the ETL procedure, a trigger table for the ETL procedure, a key field within the trigger table to provide a reference for the ETL procedure, a period at which the ETL procedure is executed, a last time at which the ETL procedure was updated, and a current time for the ETL procedure indicating that the ETL procedure is executed. The sequence number is indicative of an order of the ETL procedure in grouping of related ETL procedures. The trigger table defines a staging source table for the ETL procedure.

The logging of the control records for the ETL procedure records the name for the ETL procedure, a trigger table for the ETL procedure, the trigger table defining a staging source table for the ETL procedure, a key field within the trigger table to provide a reference for the ETL procedure, a current time for the ETL procedure indicating that the ETL procedure is executed, an error message for an abnormal data transfer during the ETL procedure, an error code for the abnormal data transfer during the ETL procedure. When the logging is completed and if the severity of the error code sufficiently large, the error message is communicated to alert a person of the abnormal data transfer during the ETL procedure.

BRIEF DESCRIPTION OF THE DRAWINGS

FIG. 4 is a table illustrating the ETL Program Monitor Records created by the ETL supervisor of this invention.

FIG. 5 is a table illustrating the ETL Control Log Records created by the ETL supervisor of this invention.

FIG. 6 is a table illustrating the ETL Cleansing Log created by the ETL supervisor of this invention.

DETAILED DESCRIPTION OF THE INVENTION

In large enterprises that may have many databases stored on database storage units, multiple ETL procedures are executed periodically to extract, transform, and load the data from the data storage units to the data warehouse to create and maintain one or more databases and from the data warehouse to create and maintain the data marts. An ETL supervisor provides the control, monitoring, and cleaning necessary for coordinating and administering the databases and data marts of the enterprise.

The ETL supervisor determines the scheduling of the ETL procedures and initiates the execution of the ETL procedures at the appropriate schedule to extract, transform data from a first database to a second database. During the execution of the ETL procedures, the ETL supervisor determines the progress of the ETL procedure and catalogs the progress and success of execution of the multiple ETL procedures. As the ETL supervisor controls the ETL procedures, the ETL supervisor catalogs the characteristics and scheduling of the multiple ETL procedures. A sub-process of the ETL procedures, generally, indicates a scheduling for the cleansing of the first database to eliminate inconsistencies, redundancies, and corruptions. The ETL supervisor extracts the scheduling of the cleansing process and at the appropriate time executes the cleansing process. The key information of the cleansing process is logged for future reference.

The ETL supervisor logs any failures in the execution of the ETL procedures. The ETL supervisor reviews the logged failures and, if the failures are sufficiently severe, The ETL supervisor transmits a message to a responsible person detailing the failure.

Figure 1:
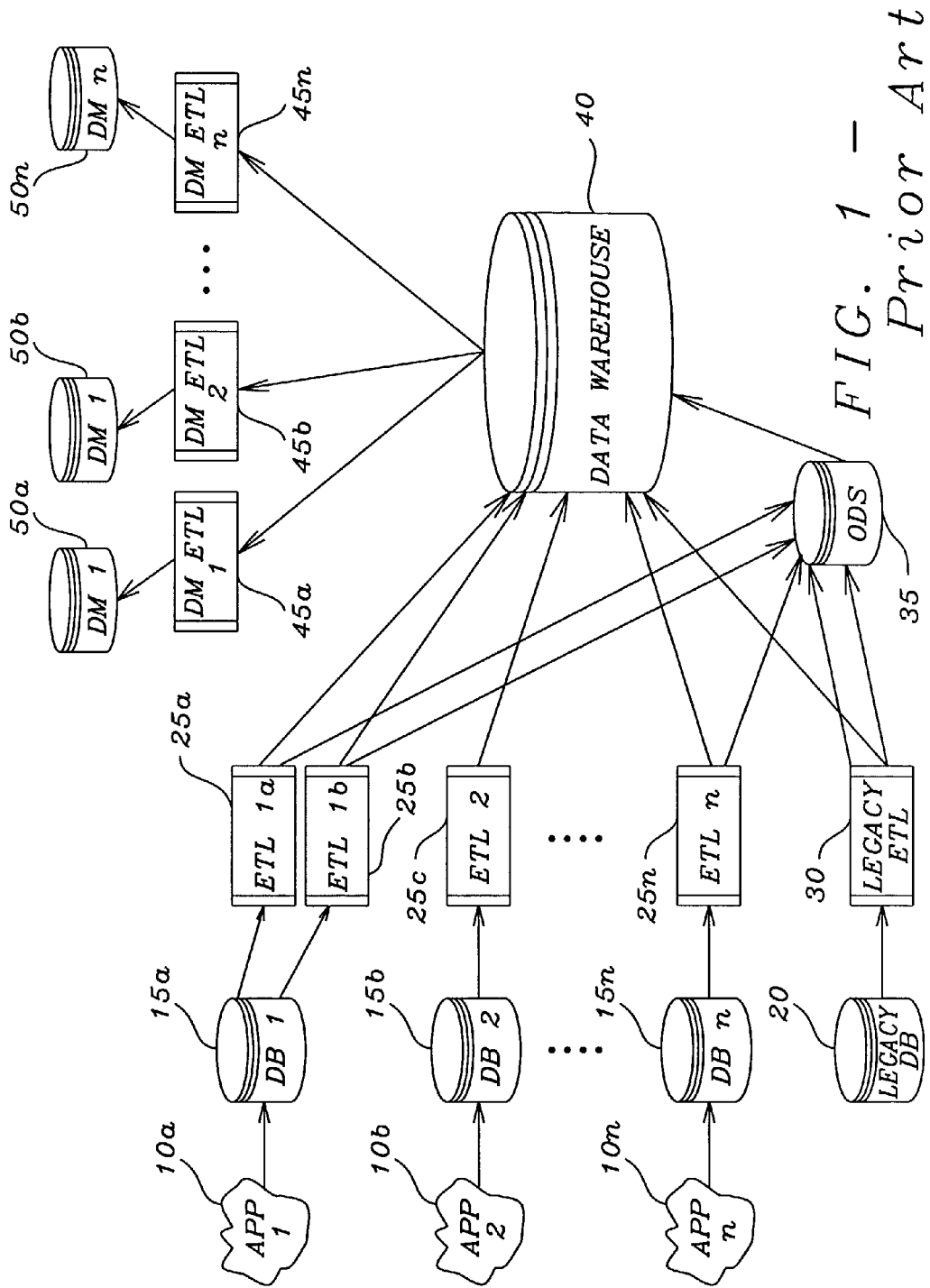
FIG. 1 is a diagram of a database system of the prior art.
Figure 2:
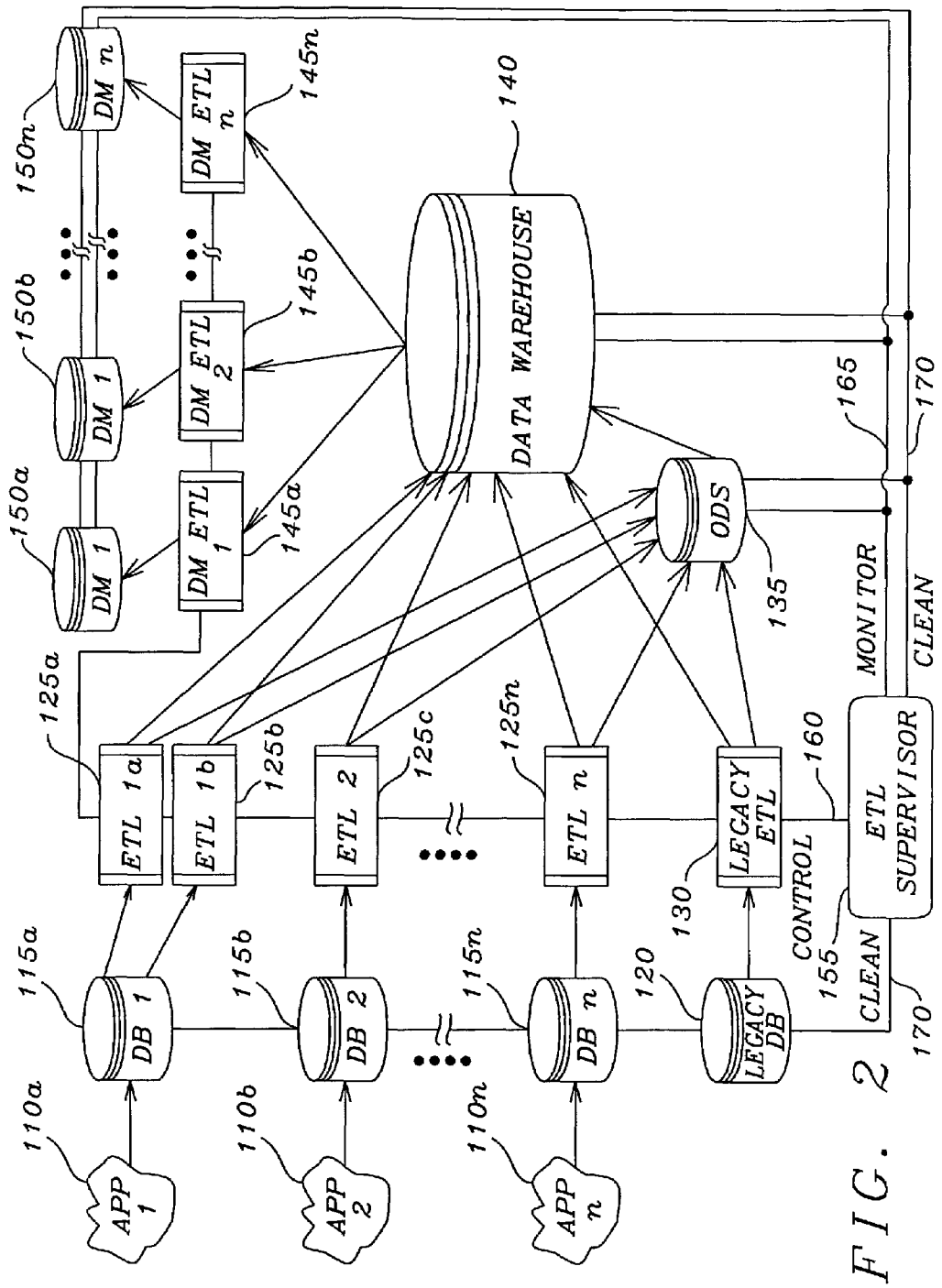
FIG. 2 is diagram of a database system of this invention.

Refer now to Fig. 2 for a discussion of the database system and the function of the ETL supervisor of this invention. Similar to the database processing systems of the prior art, the programming applications 110a, 110b, . . . 110n are executed on computer processors to create data that is stored in specific databases in database storage units 115a, 115b, . . . , 115n. The ETL procedures 125a, 125b, 125c, . . . , 125n are executed by the computer processors to remove data from the databases in the database storage units 115a, 115b, . . . , 115n, transform the data to the desired state and format, and loading of the transformed data to the data warehouse 140.

Historical data generated by older computer systems is maintained on a "legacy database" in a separate database storage unit 120. The legacy database similarly is extracted, transformed, and loaded by the legacy ETL procedure 130 to the data warehouse 140 for integration with the currently generated data from the program applications 110a, 110b, . . . 110n.

In order to prevent the database information within the database storage units 115a,115b, . . . , 115n, and 120 from being modified and potentially corrupted, an operational data storage (ODS) staging unit 135 is employed by the ETL procedures 125a, 125b, 125c, . . . , 125n, and 130 as a staging database retention device. The ETL procedures 125a, 125b, 125c, . . . , 125n, and 130 perform the transformations of the data from the database storage units 115a, 115b, . . . , 115n, and 120 prior to placement of the data to the data warehouse 140.

The ETL procedures 125a and 125b illustrate that multiple ETL procedures may be performed on a database from a single database storage unit. The transformation portion of a ETL procedure performs different conversions to the database for placement in the data warehouse 140.

The data marts 150a, 150b, . . . 150n are databases within database storage units that are created to serve a particular group requiring an individualized database. The ETL procedures 145a, 145b, . . . , 145n create and maintain of the data marts 150a, 150b, . . . 150n by extracting the necessary data from the data warehouse 140, transforming the data to meet the particular group requirements, and storing the data in databases of the data marts 150a, 150b, . . . 150n retained in database storage units.

The ETL supervisor 155 has a communication connection 160 to control the ETL procedures 125a, 125b, 125c, . . . , 125n. The ETL supervisor 155 provides the necessary control to insure that they are executed periodically, as scheduled, to extract, transform, and load the data from the data storage units 115a, 115b, . . . , 115n to the data warehouse 140. The ETL procedures 145a, 145b, . . . , 145n also have the communication connection 160 to insure that the ETL procedures 145a, 145b, . . . , 145n are executed as scheduled to create and maintain the data within the data marts 150a, 150b, . . . 150n. The ETL supervisor 155 creates a control log that details the status of the progression and any error codes and error messages generated during the characteristics and scheduling of the ETL procedures 125a, 125b, 125c, . . . , 125n, 145a, 145b, 145c, . . . , and 145n. The ETL supervisor 155 monitors the error codes and the error messages and for error codes having a sufficient severity level to require attention of administrative personnel, the ETL supervisor 155 transmits the error messages to the administrative personnel. The error messages are communicated by a telecommunications device such as a pager or by an electronic mail message.

The ETL supervisor 155 further has a communication link 165 to the database storage units 135, 140, 150a, 150b, . . . , and 150n to monitor the progression of the ETL procedures 125a, 125b, 125c, . . . , 125n, 145a, 145b, 145c, . . . , and 145n. The monitoring logs the characteristics and scheduling of the ETL procedures 125a, 125b, 125c, . . . , 125n, 145a, 145b, 145c, . . . , and 145n.

The ETL supervisor 155 further has an additional communication link 170 to the database storage units 135, 140, 150a, 150b, . . . , and 150n to control the cleansing of the database storage units 135, 140, 150a, 150b, . . . , and 150n. The ETL supervisor 155 interrogates the ETL procedures 125a, 125b, 125c, . . . , 125n, 145a, 145b, 145c, . . . , and 145n to determine the scheduling of any cleaning process required. The ETL supervisor 155 then schedules the required cleansing and institutes the cleansing by way of the communication link 170 that communicates the cleansing instructions to the database storage units 135, 140, 150a, 150b, . . . , and 150n. The control supervisor 155 logs the details of the cleansing schedule for each of the ETL procedures 125a, 125b, 125c, . . . ,125n, 145a, 145b, 145c, . . . , and 145n.

Figure 3:
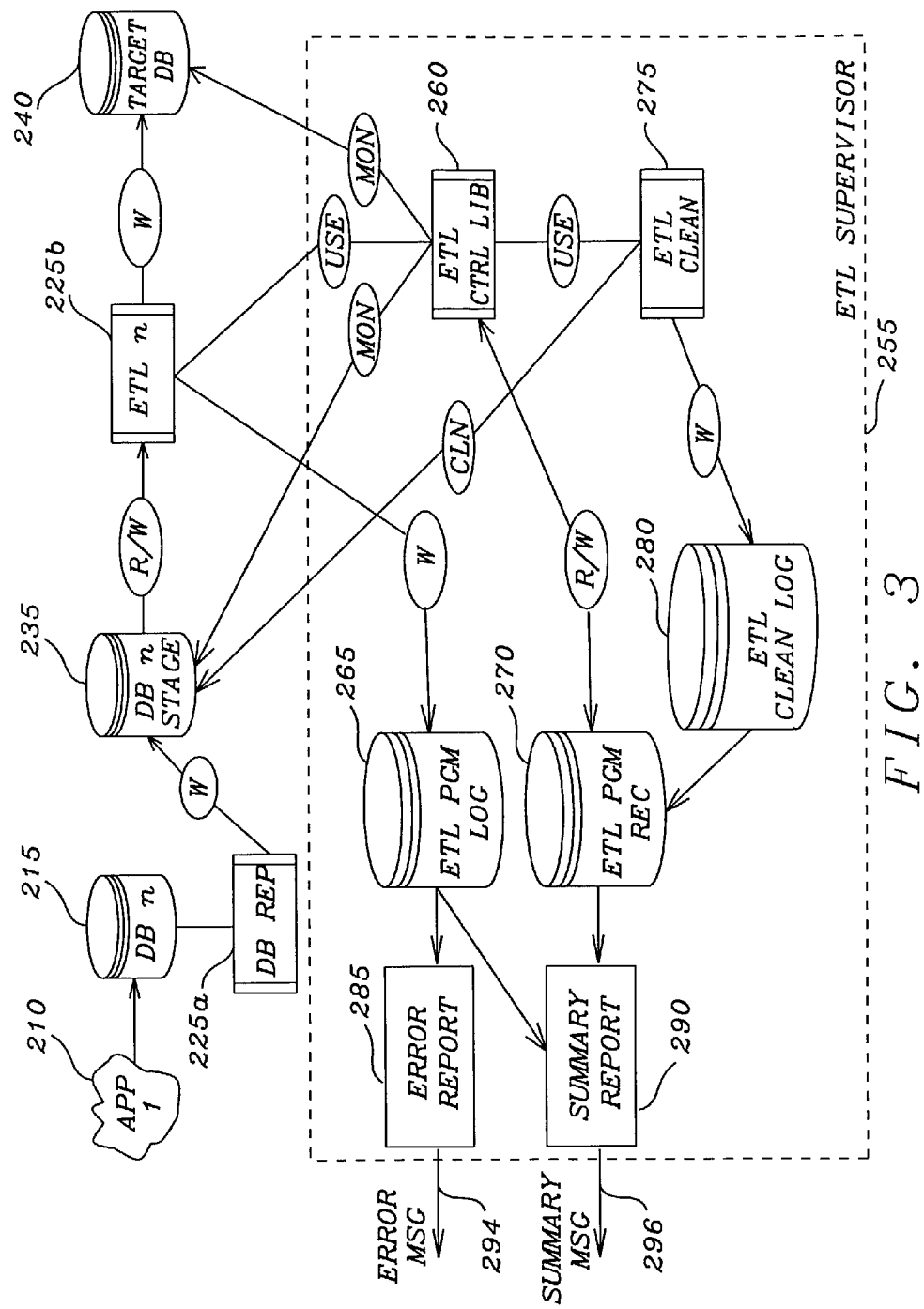
FIG. 3 is diagram of the database system of this invention illustrating and detailing the structure of the ETL supervisor circuit.

FIG. 3 illustrates the structure of the ETL supervisor 255 of the database system of this invention. The application 210 generates data, which is entered into the database retained in the database storage unit 215. When the data within the database storage unit 215 is to be extracted for placement in the target database such as a data warehouse, the database reproduction procedure is executed to write the data extracted from the database storage unit 225 to the ODS staging unit 235. The ODS staging unit 235 receives the data from the database storage unit 215 with no changes and allows the modification of the data with no changes to the original database.

The ETL control library procedure 260 provides the necessary procedures to monitor the scheduling of the ETL procedures 225b. At the scheduled time, the ETL control library procedure 260 initiates the implementation of the ETL procedure 225b to perform the extraction and transformation of the data stored in the ODS staging unit 235. The ETL procedure 225b extracts the data from the ODS staging unit 235 and modifies the data according to the requirements of the transformation.

This extraction and transformation causes data to be read from and written to the ODS staging unit 235. Upon completion of the transformation of the data, the ETL procedure 225b writes the data to the target database retained by the target database storage unit 240.

The ETL control library procedure 260 creates the ETL program record database 270 by writing the procedure records for the ETL procedure 225b. The ETL procedure records details the characteristics and scheduling of the ETL procedure 225b. The ETL control library procedure 260 reads the program record database 270 for determining the scheduling of the ETL procedure 225b.

Refer now to FIG. 4 for a description of the structure of the program record database 270. Each record of the ETL program record database 270 has a program name field 300, which provides a descriptive label of each of the ETL procedures 225a and 225b to be executed. The program subject record field 305 describes the subject or group of programs to which the ETL procedure is related 225b. The program sequence record field 310 describes the order in which an ETL procedures 225b of a group are to be executed. The order of the ETL procedures 225b generally, but not necessarily, of the same subject or group of related programs. The last-update-time record 315 indicates the last recording date and time that data migrated successfully from the database storage unit 215 to the ODS staging unit 235. The update time 320 is the date and time at which the database within the ODS staging unit is successfully transformed by the ETL procedure 225b. The trigger table field 325 is the source table within the ODS staging unit 235 that is the pointer or cursor for the ETL procedure 225b. The record key field 330 is the primary key field of the trigger table. The record key field 330 is used as the reference in trouble shooting activity to correct functioning of the ETL procedure 225b. The frequency field 335 describes the rate of recurrence for the ETL procedure 225b.

The ETL control library procedure 260 provides a pointer to the ETL procedure 225b to transfer the control records detailing the status of the ETL procedure 225b to the ETL control log database 265. The program name field 340 indicates which of the ETL procedures has had an abnormal extraction of the data from the ODS staging unit 235, transformation of the data and loading of the data to the target database 240. The record time field 345 indicates the time when the abnormal transfer of the data occurred. The record key value field 350 specifies the record within the data containing the abnormality of the data. The trigger table 355 describes the table containing the abnormality of the data. . The error code field 360 denotes the standard error code of the database language employed or the error code of the ETL procedure 225b describing the abnormality of the data. The error message field 365 provides a user defined error message providing a description of the cause of the abnormality of the data. The ETL status field 370 provides a severity indication to provide a level of importance of the abnormality of the data. For instance, a failure message may require instantaneous attention, whereas a caution message may require only a highlight for a summary report.

Returning to FIG. 3, the error reporter 285 is a mechanism that queries the ETL control log database 265 to determine the severity of abnormalities recorded in the ETL control log database 265. If the severity is sufficiently large, the error reporter 285 transmits a message 294 to a responsible person that a severe abnormality in the ETL procedure 225b has occurred. Upon receipt of the message 294, the person can then take appropriate action to rectify any of the abnormalities and reconstruct the original data. The message 294 is transmitted by a telecommunication device such as pager or by an electronic message (email).

The ETL cleaning procedure 275 transmits a request through the ETL control procedure 260 to the ETL procedure 225b for a schedule for cleansing the database residing in the ODS staging unit 235. The cleaning procedure 275 eliminates inconsistencies, redundancies, and corruptions from the database. At the scheduled time for the cleansing of the database, the ETL cleansing procedure 275 is activated and the database resident in the ODS staging unit 235 is cleansed. The cleansing procedure 275 creates and maintains an ETL cleansing log 280.

The field structure for the records of the ETL cleansing log 280 is shown in FIG. 6. The program name field 375 is the designator of the ETL procedure 225a requiring the cleansing of the database. The trigger table field 380 is the source table within the ODS staging unit 235 that the pointer or cursor for the ETL procedure 225b. The cleansing table field 385 is the database from which the inconsistent, redundant, or corrupt data is to be removed. The update time field 390 is the date and time for the scheduled cleansing for the ETL procedure 225b. The trigger key list field 395 is the key fields of the trigger table used by the ETL procedure 225b. The clean key list field 400 is the fields in the cleansing table used for the purging of the cleansing table.

Periodically, the summary reporter 290 collects the records of the ETL control log database 265, the ETL program record database 270, and the ETL cleansing log database 280. The records are compiled and transferred as a summary report 296 providing a summation of the contents of the activities of the ETL supervisor 255.

Figure 7:
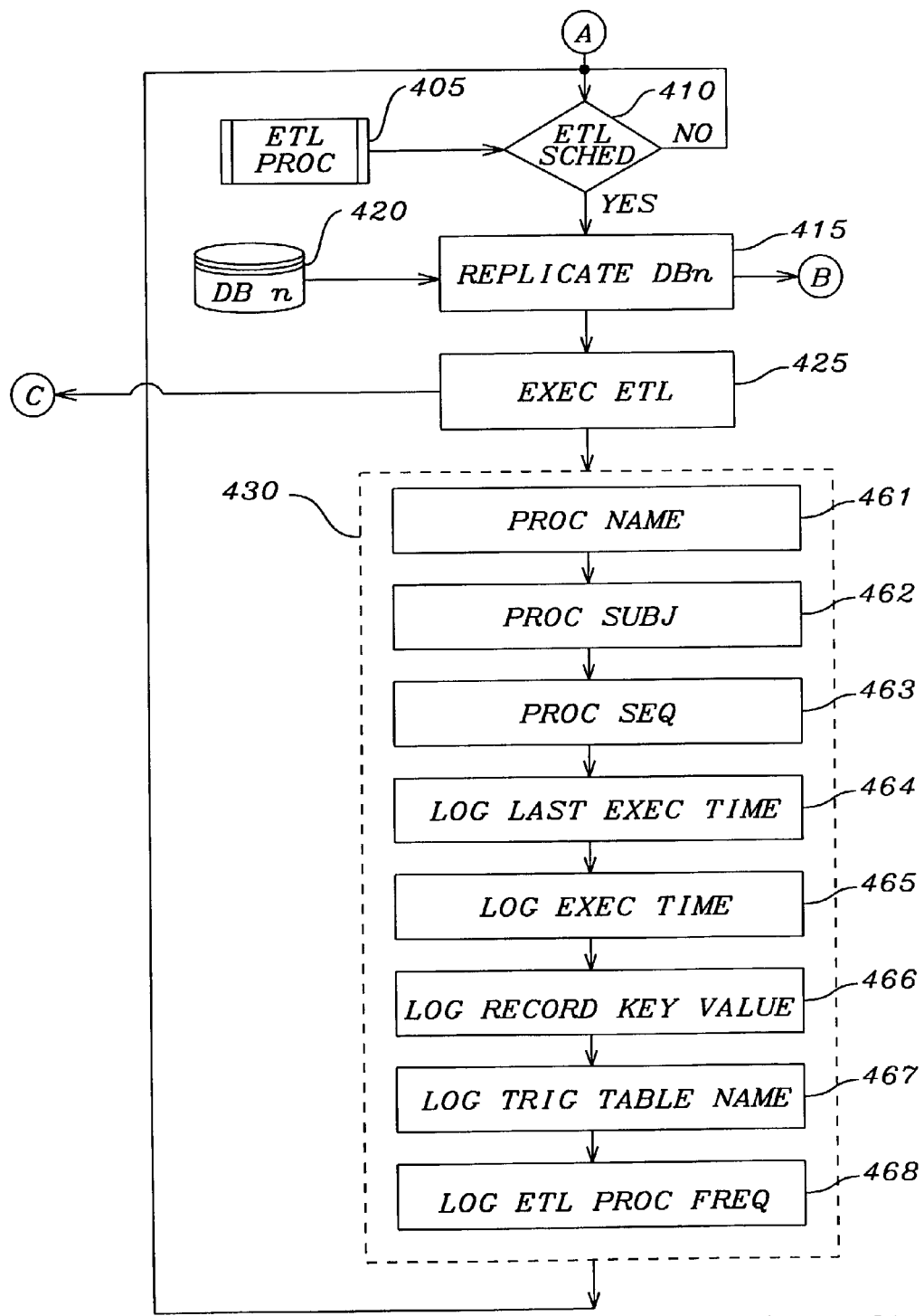
FIGS. 7-9 are flow charts detailing the method for supervising execution of ETL procedures of this invention.
Figure 8:
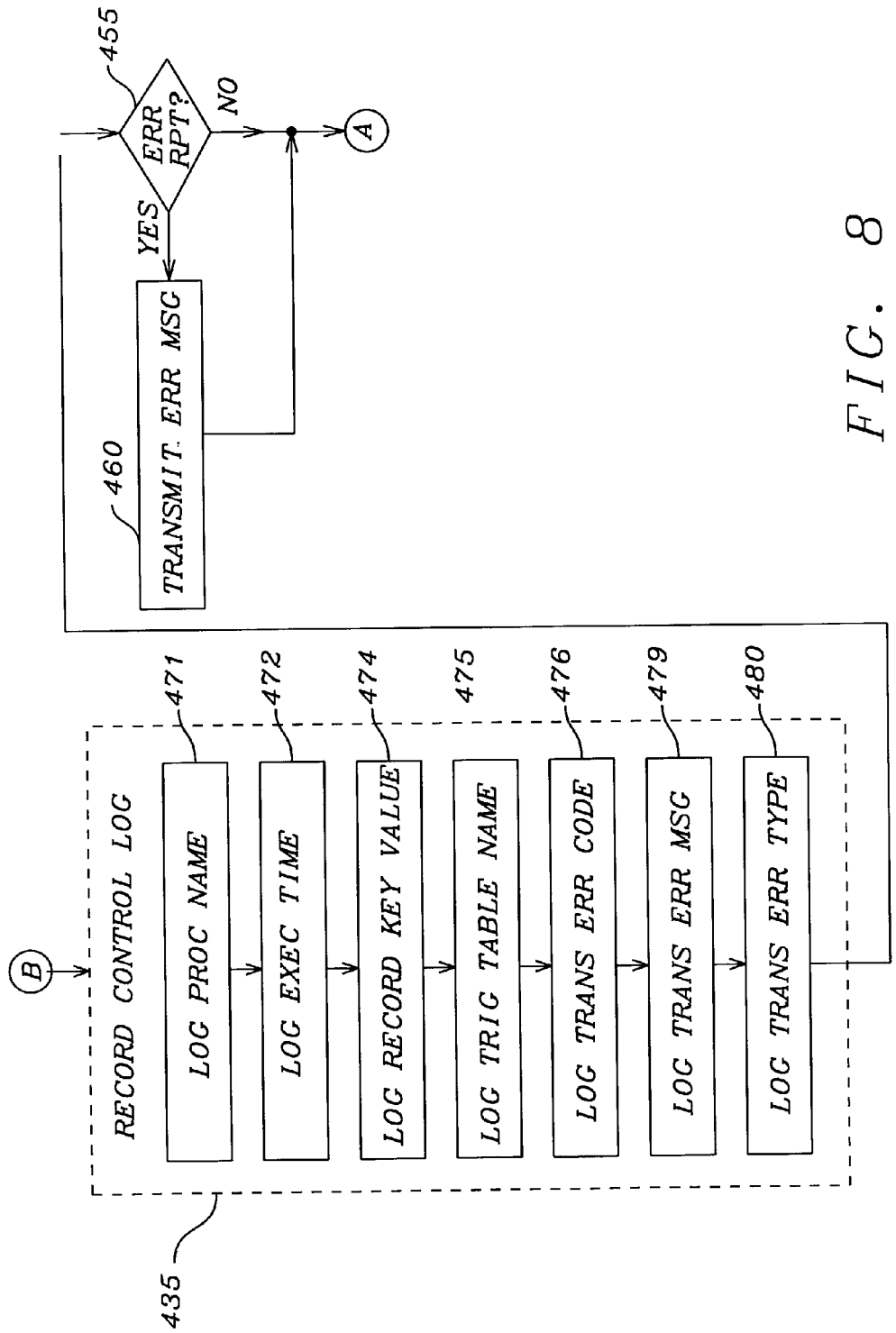
Figure 9:
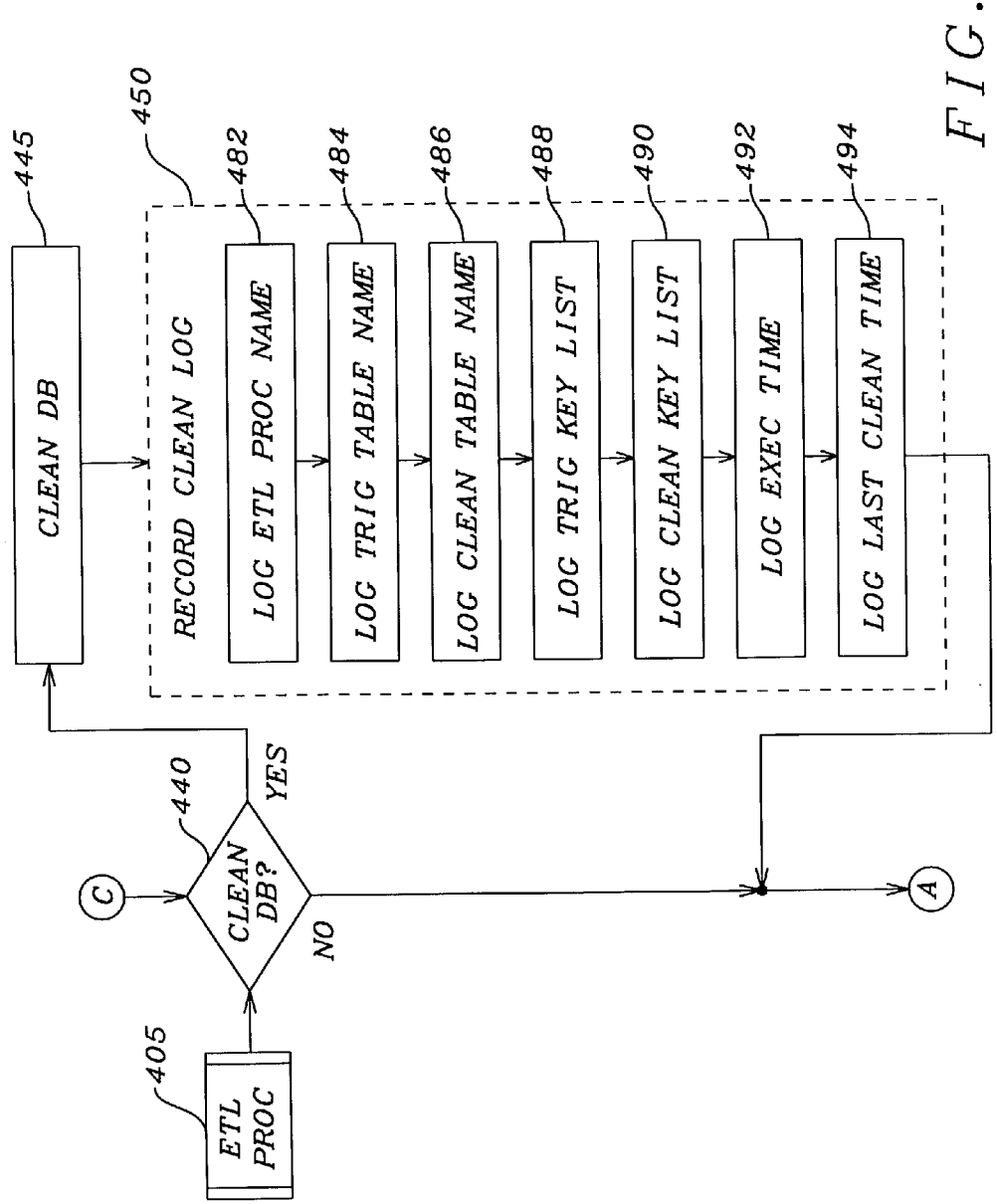

The database system, as above described, maybe implemented as program code written in a programming language such as PL/SQL (Procedural Language extension to Structured Query Language) executed on a computing system. The computing system has at least one execution processor that implements the ETL procedures 125a, 125b, 125c, . . . , 125n, 145a, 145b, 145c, . . . , and 145n of FIG. 2 and magnetic or optical storage media such as disks or tapes to retain the databases retained by the database storage units 135, 140, 150a, 150b, . . . , and 150n of FIG. 2 as described. The ETL supervisor 155 of FIG. 2 is also implemented as program code written in a program language such as PL/SQL with the ETL control log database 265, the ETL program record database 270, and the ETL cleansing log database 280 being retained on the magnetic or optical storage medium. Refer now to FIGS. 7-9 for a discussion of the method for the supervision of ETL procedures of this invention as executed on a computing system.

The ETL supervisory process begins by querying (Box 410) the scheduling of the ETL procedure (Box 405). When the time for the execution for the ETL procedure (Box 405)

has arrived, the data from the database 420 on which the ETL procedure is to be executed is replicated (Box 415) into an operational data storage (ODS) staging unit. The ETL procedure is executed (Box 425) upon the replicated data within the ODS staging unit. The ETL supervisory process then logs (Box 430) procedure records for the ETL procedure detailing characteristics and scheduling of the ETL procedure. The ETL supervisory process continues with logging control records (Box 435) for the ETL procedure detailing status of the ETL procedure. A scheduling for cleansing the first database is queried (Box 440) from the ETL procedure (Box 405). At a time, when the cleansing is scheduled to be executed, the data present in the ODS staging unit is cleansed (Box 445) to eliminate inconsistencies, redundancies, and corruptions from the first database. Finally the ETL supervisory process logs (Box 450) a cleansing record for the ETL procedure detailing a cleansing schedule for the first database.

The logging (Box 430) of the ETL procedure records a name for the ETL procedure (Box 461), a subject for the ETL procedure (Box 462), a sequence number of the ETL procedure (Box 463), a trigger table for the ETL procedure (Box 467), a key field within the trigger table to provide a reference for the ETL procedure (Box 466), a frequency at which the ETL procedure is executed (Box 468), a last time at which the ETL procedure was updated (Box 464), and a current time for the ETL procedure indicating that the ETL procedure is executed (Box 465). The sequence number is indicative of an order of the ETL procedure in grouping of related ETL procedures. The trigger table defines a staging source table for the ETL procedure. The structure and format for the ETL procedure records are as described in FIG. 4.

The logging (Box 435) of the control records for the ETL procedure records the name for the ETL procedure (Box 471), a current time for the ETL procedure indicating that the ETL procedure is executed (Box 472), a key field (Box 474) within the trigger table to provide a reference for the ETL procedure, a trigger table for the ETL procedure (Box 475), an error code for the abnormal data transfer during the ETL procedure (Box 476), an error message for an abnormal data transfer during the ETL procedure (Box 479), and an error type indicating a severity of the error (Box 480). The trigger table defines a staging source table for the ETL procedure. The structure of the control records is as described in FIG. 5.

When the logging of the control records (Box 435) is completed.

The error type is examined (Box 455) and if the severity of the error code sufficiently large, an error message (Box 460) is communicated to alert a person of the abnormal data transfer during the ETL procedure. The error message is transmitted by a telecommunication method such as a pager or by an electronic message (email).

The logging (Box 450) of the cleansing log records the field structure for the records of the ETL cleansing log including logging the program name field (Box 482), the trigger table field, (Box 484), the cleansing table field (Box 486), the trigger key list field (Box 488), the clean key list field (Box 490), and the update time field (Box 492). The cleansing log records are as described in FIG. 6.

While this invention has been particularly shown and described with reference to the preferred embodiments thereof, it will be understood by those skilled in the art that various changes in form and details may be made without departing from the spirit and scope of the invention.

The invention claimed is:

1. A method for the supervision of at least one extraction/transformation/loading (ETL) procedure of a first database to create a second data base comprising the steps of:
   logging procedure records for said ETL procedure detailing characteristics and scheduling of said ETL procedure;
   logging control records for said ETL procedure detailing status of said ETL procedure;
   logging a cleansing record for said ETL procedure detailing a cleansing schedule for said first database;
   logging errors associated with the logging of procedure records end control records;
   evaluating a severity of the errors for determining whether a personnel is to be notified,
   wherein logging control records for said ETL procedure comprises:
   recording the name for said ETL procedure;
   recording a trigger table for said ETL procedure, said trigger table defining a staging source table for said ETL procedure;
   recording a key field within said trigger table to provide a reference for said ETL procedure;
   recording a current time for said ETL procedure indicating that said ETL procedure is executed;
   recording an error message for an abnormal data transfer during said ETL procedure; and
   recording an error code for said abnormal data transfer during said ETL procedure.

2. The method of claim 1 further comprising the steps of:
   determining a scheduling for execution of said ETL procedure; and
   at a time when said ETL procedure is scheduled to be executed, executing said ETL procedure, 3. The method of claim 1 futher comprising the steps of:
   determining from said ETL procedure a scheduling for cleansing said first database; and
   at a time when said cleansing is scheduled to be executed, cleansing said first database to eliminate inconsistencies, redundancies, and corruptions from said first database.

4. The method of claim 1 wherein logging procedure records for said ETL procedure comprises the steps of:
   recording a name for said ETL procedure;
   recording a subject for said ETL procedure;
   recording a sequence number of said ETL procedure, said sequence number indicative of an order of said ETL procedure in grouping of related ETL procedures;
   recording a trigger table for said ETL procedure, said trigger table defining a staging source table for said ETL procedure;
   recording a key field within said trigger table to provide a reference for said ETL procedure;
   recording a period at which said ETL procedure is executed;
   recording a last time at which said ETL procedure was updated; and
   recording a current time for said ETL Proc e indicating that said ETL procedure is executed.

5. The method of claim 1 further comprising the step of:
   communicating said error message to alert a person of the abnormal data transfer during said ETL procedure.

6. An apparatus of a computer processor for the supervision of at least one extraction/transformation/loading (ETL) procedure of a first database to create a second data base comprising the steps of:

logging procedure records for said ETL procedure detailing characteristics and scheduling of said ETL procedure;

logging control records for said ETL procedure detailing status of said ETL procedure;

logging a cleansing record for said ETL procedure detailing a cleansing schedule for said first database;

logging errors associated with the logging of procedure records end control records;

evaluating a severity of the errors for determining whether a personnel is to be notified, wherein logging control records for said ETL procedure comprises:

recording the name for said ETL procedure:

recording a trigger table for said ETL procedure, said trigger table defining a staging source table for said ETL procedure;

recording a key field within said trigger table to provide a reference for said ETL procedure;

recording a current time for said ETL procedure indicating that said ETL procedure is executed;

recording an error message for an abnormal data transfer during said ETL procedure; and recording an error code for said abnormal data transfer during said ETL procedure.

7. The apparatus of claim 6 further comprising the steps of:

determining a scheduling for execution of said ETL procedure; and executing said ETL procedure, at a time when said ETL procedure is scheduled to be executed.

8. The apparatus of claim 6 further comprising the steps of:

determining from said ETL procedure a scheduling for cleansing said first database; and cleansing said first database to eliminate inconsistencies, redundancies, and corruptions from said first database, at a time when said cleansing is scheduled to be executed.

9. The apparatus of claim 6 wherein logging procedure records for said ETL procedure comprises the steps of:

recording a name for said ETL procedure;

recording a subject for said ETL procedure;

recording a sequence number of said ETL procedure, said sequence number indicative of an order of said ETL procedure in grouping of related ETL procedures;

recording a trigger table for said ETL procedure, said trigger table defining a staging source table for said ETL procedure;

recording a key field within said trigger table to provide a reference for said ETL procedure;

recording a period at which said ETL procedure is executed;

recording a last time at which said ETL procedure was updated; and recording a current time for said ETL procedure indicating that said ETL procedure is executed.

10. The apparatus of claim 6, further comprising the step of:

communicating said error message to alert a person of the abnormal data transfer during said ETL procedure.

11. A database processing system comprising;

a plurality of database storage units containing a plurality of databases;

at least one extraction/transformation/loading (ETL) procedure in communication with the plurality of databases to execute ETL procedures to transfer database information between the database storage units; and an ETL procedure supervisor in communication with the plurality of database storage units and the ETL procedures for controlling and monitoring execution of ETL procedures between a first database and a second database incorporated within the plurality of database storage units; and a procedure recorder in communication with the second database to recieve logging information from said ETL procedure detailing characteristics and scheduling of said ETL procedure upon said second database, wherein the procedure recorder executes the steps of:

recording a name for said ETL procedure;

recording a subject for said ETL procedure;

recording a sequence number of said ETL procedure, said sequence number indicative of an order of said ETL procedure in grouping of related ETL procedures;

recording a trigger table for said ETL procedure, said trigger table defining a staging source table for said ETL procedure;

recording a key field within said trigger table to provide a reference for said ETL procedure;

recording a period at which said ETL procedure is executed;

recording a last time at which said ETL procedure was updated;

recording a current time for said ETL procedure indicating that said ETL procedure is executed, and wherein said procedure controller records an error message for an abnormal data transfer during said ETL procedure and an error code for said abnormal data transfer during said ETL procedure;

wherein the ETL procedure supervisor executes the steps of:

logging errors associated with the logging of procedure records and control records; and evaluating a severity of the errors for determining whether a personnel is to be notified.

12. The database processing system of claim 11 wherein the ETL procedure supervisor comprises:

a procedure recorder in communication with the second database to receive logging information from said ETL procedure detailing characteristics and scheduling of said ETL procedure upon said second database; and an ETL procedure controller in communication with an ETL procedure for controlling said ETL procedure and for receiving logging control information from said ETL procedure detailing status of said ETL procedure.

13. The database processing system of claim 11 wherein the ETL procedure supervisor further comprises:

a cleansing controller in communication with the first database to institute cleansing of said first database and for receiving cleansing information from said first database detailing a cleansing schedule for said first database.

14. The database processing system of claim 11 wherein the BTL procedure controller executes the steps of:

determining a scheduling for execution of said ETL procedure; and at a time when said ETL procedure is scheduled to be executed, executing said ETL procedure.

15. The database processing system of claim 11 wherein the cleansing controller executes the steps of:

determining from said ETL procedure a scheduling for cleansing said first database; and at a time when said cleansing is scheduled to be executed, cleansing said first database to eliminate inconsistencies, redundancies, and corruptions from said first database.

16. The database processing system of claim 11 further comprising:
communication controller in communication with the ETL procedure controller to transmit said error message so as to alert a person of the abnormal data transfer during said ETL procedure.

17. A computer-implemented database system comprising:
a plurality of database storage units each containing a plurality of databases; and
at least one execution processor in communication with the plurality of databases to execute extraction/transformation/loading (ETL) procedures for transferring database information between the database storage units and to execute at least one ETL supervisor process for controlling and monitoring execution of said ETL procedures between a first database and a second database incorporated within the plurality of database storage units, wherein said ETL supervisor process comprises the steps of:
recording a name for said ETL procedure;
recording a subject for said ETL procedure;
recording a sequence number of said ETL procedure, said sequence number indicative of an order of said ETL procedure in grouping of related ETL procedures;
recording a trigger table for said ETL procedure, said trigger table defining a staging source table for said ETL procedure;
recording a key field within said trigger table to provide a reference for said ETL procedure;
recording a period at which said ETL procedure is executed;
recording a last time at which said ETL procedure was updated; and
recording a current time for said ETL procedure indicating that said ETL procedure is executed, and wherein recording an error message for an abnormal data transfer during said ETL procedure;
recording an error code for said abnormal data transfer during said ETL procedure logging errors associated with the logging of procedure records and control records; and
evaluating a severity of the errors for determining whether a personnel is to be notified.

18. The computer implemented database system of claim 17 wherein the ETL supervisor process comprises the steps of:
logging procedure records for said ETL procedure detailing characteristics and scheduling of said ETL procedure;
logging control records for said ETL procedure detailing status of said ETL procedure; and
logging a cleansing record for said ETL procedure detailing a cleansing schedule for said first database.

19. The computer-implemented database system of claim 18 wherein the ETL supervisor process further comprises the steps of:
determining a scheduling for execution of said ETL procedure; and
at a time when said ETL procedure is scheduled to be executed, executing said ETL procedure.

20. The computer-implemented database system of claim 18 wherein the ETL supervisor process further comprises the steps of:
determining from said ETL procedure a scheduling for cleansing said first database; and
at a time when said cleansing is scheduled to be executed, cleansing said first database to eliminate inconsistencies, redundancies, and corruptions from said first database.

21. The computer-implemented database system of claim 18 wherein the ETL supervisor process further comprising the step of:
communicating said error message to alert a person of the abnormal data transfer during said ETL procedure.

* * * * *